(No Model.)
F. MOSSBERG.
SCREW PRESS.
No. 519,867. Patented May 15, 1894.
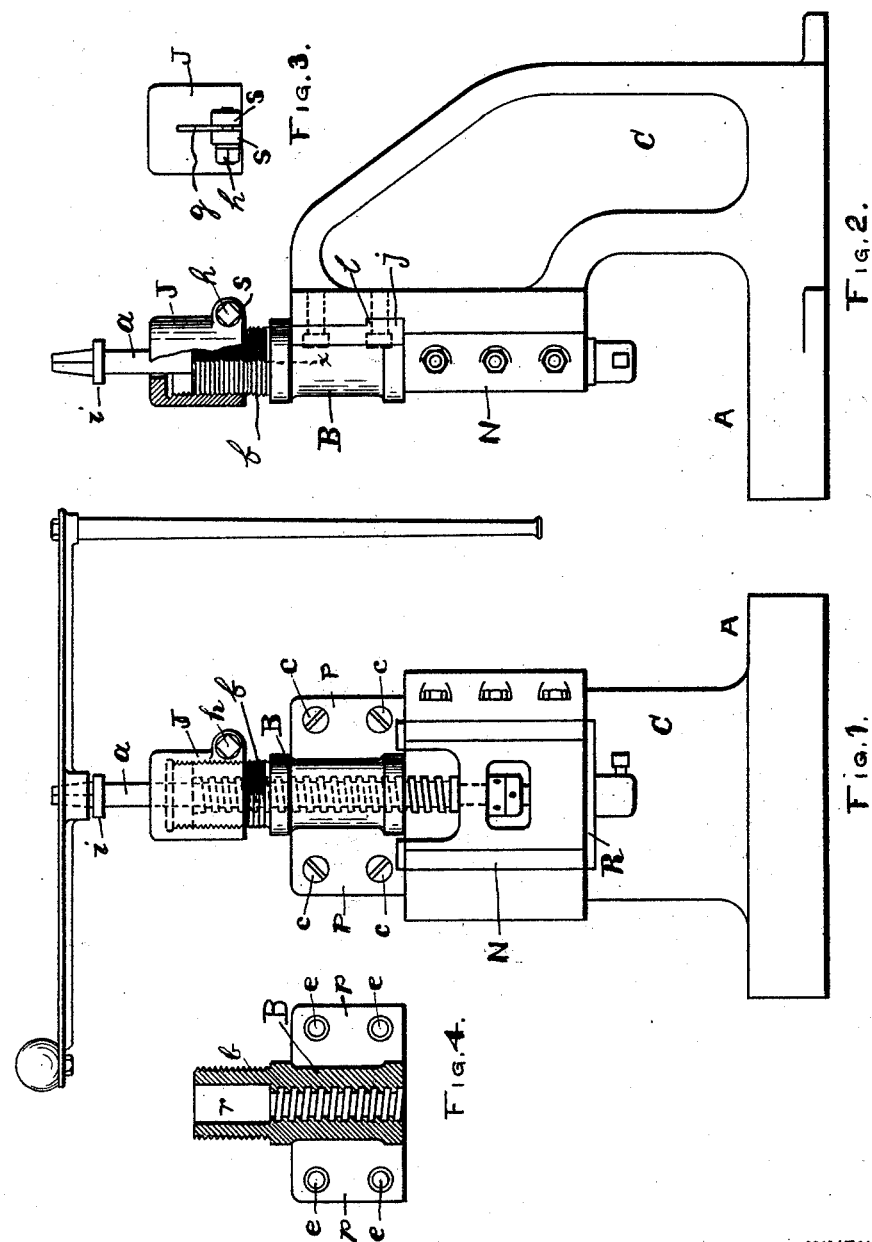
WITNESSES:
INVENTOR
Frank Mossberg
BY
Benj. Arnold
ATTORNEY

UNITED STATES PATENT OFFICE.

FRANK MOSSBERG, OF ATTLEBOROUGH, MASSACHUSETTS.

SCREW-PRESS.

SPECIFICATION forming part of Letters Patent No. 519,867, dated May 15, 1894.

Application filed May 31, 1893. Serial No. 476,100. (No model.)

*To all whom it may concern:*

Be it known that I, FRANK MOSSBERG, of Attleborough, in the county of Bristol and State of Massachusetts, have invented certain new and useful Improvements in Screw-Presses; and I do hereby declare that the following is a full, clear, and exact description thereof, reference being had to the accompanying drawings, and to the letters of reference marked thereon, which form a part of this specification.

This invention relates to improvements in jewelers' screw presses, and is designed to make a stronger attachment for the main screw nut and to provide an adjustable stop to limit the descent of the main screw and upper die, when the press is in use.

It is illustrated in the accompanying drawings.

Figure 1, represents a side elevation of the press. Fig. 2, shows a front elevation of the main parts of the press, with a part of the check cap broken away to show the interior. Fig. 3, represents the check cap with slotted clamp side in front. Fig. 4, is a sectional view of the screw nut and its sleeve, taken vertically through the center, on line $x$, in Fig. 2.

A, is the bed of the press that holds the lower die; C, the standard that holds the pressure screw $a$, and its nut B. The standard and bed may be cast in one piece, or separately and bolted together. The ways N, that hold the upper die block R, are also cast in one piece with the standard. The nut B, has a flange P, cast on each side of it, with holes $e, e$, to receive the bolts $c, c$, that hold it to the standard C. A flange $j$, is also cast on the back of the nut B, that enters a recess $l$, made in the face of the standard C, to assist in taking the thrust of the screw $a$, when it is in operation. The nut B, has a sleeve $b$, on its upper end, that may be made separate and bolted on; but it is preferably cast in one piece with the nut, as it requires less labor, and is not liable to become loose. A coarse right-hand screw thread is made on the inside of the nut B, to receive the pressure screw $a$, and the sleeve $b$ is cored out large enough at $r$, to allow the screw $a$, to be put down through it into the screw thread in the nut. A fine left-hand screw thread is made on the outer surface of the sleeve $b$, and a hollow check cap J, has a fine screw thread made on its inside to fit into the thread on the outside of the sleeve $b$. The hole in the top of the cap J, is of the same size as the hole in the sleeve $b$. A slot $g$, is made in one side of the cap J, lengthwise, with an ear $s$, made on the cap on each side, with a hole through the ears to receive a screw bolt $h$, by means of which the sides of the slot can be drawn together to clamp the check cap to the sleeve, when necessary.

The object of the cap J, is to form an adjustable gage or limit to the extent of the motion downward of the screw and upper die, as may be required by the nature of the work it is to perform. This cap J, when the screw bolt $h$, is loosened, can be raised or lowered, by turning it around on the sleeve, and in this way vary the point in height, at which the collar $i$, on the screw $a$, will come in contact with it and stop the screw, and when rightly adjusted to the work, the cap can be fastened securely on the sleeve, by tightening the screw bolt $h$. The thread of the screw being right-handed and the screw thread on the sleeve, left-handed, the motion of the screw when it comes in contact with the cap, has less tendency to move it, and change the limit of its motion downward. The flange $j$, in the recess $l$, is designed to relieve the bolts $c$, of the strain thrown on the nut B, when the upper and lower dies meet on the metal between them, when the press is in operation.

Having thus described my improvements, I claim as my invention—

1. In a screw press, the combination with the nut for the pressure screw, of a sleeve forming an extension of its upper end, said sleeve having a fine screw-thread made on its outside, and a check cap having a screw thread made on its inside, fitting onto the screw thread on said sleeve, and means for clamping the check cap fast on the sleeve, substantially as described.

2. In a screw press of the character herein described, the combination of a check cap fitted to screw down over an extension of the nut of the pressure screw, and having a slot made in one side, with an ear on each side of the slot fast on the cap, and provided with a screw for closing said cap, to clamp the cap on said nut extension with said nut, substantially as described.

3. In a screw press, a nut for the pressure screw, having a flange on each side to bolt it to the standard by, and a horizontal flange on its back, fitting into a recess in the face of the standard, in combination with said standard and screw, substantially as described.

FRANK MOSSBERG.

Witnesses:
BENJ. ARNOLD,
E. B. READ.